Patented Aug. 29, 1939

2,171,505

UNITED STATES PATENT OFFICE 2,171,505

LAMINATED FABRIC

Gustave Klinkenstein, Maplewood, N. J., assignor to Maas & Waldstein Company, Newark, N. J., a corporation of New Jersey No Drawing. Application August 10, 1935, Serial No. 35,679

7 Claims. (Cl. 154—46)

This invention relates broadly to adhesive compositions adapted to unite sheets or layers of similar or dissimilar material to form laminated material and to the laminated material so formed. More particularly, the invention relates to an adhesive adapted to impart a definite desirable stiffness to laminated material, the plies of which may be relatively flexible and to retain such stiffness indefinitely regardless of the use or treatment, within limits, to which the material may be subjected.

It has been recognized that collars, cuffs, shirt fronts and other articles of wearing apparel which have been starched in laundering to give them the desired stiffness in use have a tendency to soften and become unsightly by the action of perspiration and moisture, while the starching of such articles after each washing involves expense, effort, time and skill and is destructive of the material. To overcome these difficulties, it has been proposed to coat one or more surfaces of the article with a thermoplastic composition. Again, a lining material has been coated or saturated with or has otherwise had incorporated therein or therewith a thermoplastic composition, such as a derivative of cellulose, which is afterwards united with one or more outer plies of face goods which have been caused to adhere to the lining by softening the adhesive with solvent and/or heat and pressure whereby the solvent is driven off and the plies or laminations are joined together and the laminated material so formed possesses a stiffness comparable to a starched article.

Existing adhesives, however, have generally not been wholly satisfactory for securing plies of fabric together in a collar or other article of wearing apparel since the adhesive has tended to soften at the temperature of the boiling water used in laundering and the bond between the plies has been broken. Similarly, the adhesive used has not been sufficiently resistant to alkalis met with in laundering and to the acids of perspiration or the material has been so stiff that the collar has not had the semi-soft characteristic so desirable to the comfort of the wearer. In other attempts, the adhesive has given a perceptiele color to white goods.

Another object of the invention is an adhesive which, after having been applied or coated on one lamination may be caused to fuse and to adhere another lamination thereto, merely by the application of heat and pressure.

An adhesive is sought by the present invention which shall have high adhesive properties; impart desirable stiffness to the goods with that degree of flexibility rendering a collar, for instance, comfortable to the wearer; which shall be colorless or waterwhite; which shall be capable of acquiring a desired color for use with colored material; which shall be resistant to the acids, alkalis and temperatures met with in laundering and in use and which is preferably fast drying as well as one which has great compatibility for the various sizing compounds used in finishing different types of cloth.

These and other objects of the invention and the means for their attainment will be more apparent from the following detailed description disclosing various embodiments by which the invention may be realized.

In preparing the adhesive, it is preferred to employ both cellulose acetate and nitrocellulose although either of these cellulose derivatives may be used without the other with satisfactory results. Cellulose acetate has been found to hold its color; to be water resistant and to have desirable stiffening properties while nitrocellulose has been found to impart better adhesion to the composition as well as stiffness and has greater compatibility for the different sizing compounds used in finishing various kinds of cloth.

It is found desirable to employ one or more volatile solvents which are common solvents for both the cellulose acetate and the nitrocellulose. Acetone is such a solvent although any common solvent for both constituents may be used such as methyl acetate, it being desired that a solvent having a low boiling point be used whereby a fast drying compound is obtained. Such a solvent is relatively expensive and, if desired, a diluent may be substituted for a part of the common solvent. Such a diluent should again have a low boiling point so that a fast drying compound may be obtained. Such a diluent is conveniently, ethyl methyl ketone which is a solvent for the nitrocellulose, or benzol or ethyl alcohol, this diluent, however, being added only in amounts insufficient to precipitate cellulose compounds from the solution.

A plasticizer for the cellulose derivatives is also employed, desirably one which is not only a plasticizer for the cellulose acetate but also for the nitrocellulose. I prefer to use methyl phthalyl ethyl glycolate for the reason that it is highly water resistant and gives a clear solution on heating and is a perfect solvent for both of the cellulose derivatives. Sucrose octa-acetate, dibutyl tartrate or dimethyl phthalate has similar properties and may be substituted therefor in the composition although somewhat less effectively. A plasticizer to be used must have the physical characteristics of being able to dissolve cellulose acetate on standing at room temperature or upon warming. A convenient test for such choice of plasticizer is to mix equal parts of cellulose acetate and the plasticizer under consideration and heat at 100° C. If a perfectly clear solution is obtained, the plasticizer is suitable for the purpose at hand. Triphenyl phosphate, monocresyl diphenyl phosphate, tricresyl phosphate, dibutyl phthalate, diethyl phthalate and other compounds which are listed in the technical literature as possessing plasticizing properties for both cellulose acetate and cellulose nitrate do not form true solutions when subjected to the foregoing test and are not suitable as the plasticizer of this invention.

It is desirable, although not essential, to render the composition substantially flame proof or non-burning and resistant to the alkalis, for instance, met with in laundering and to mild acids such as is encountered in perspiration. Such an ingredient may be a plasticizer for the nitrocellulose and may be added to the composition in substitution for a proportionate part of the aforesaid common plasticizer. A substance which has been found to give excellent results for this purpose is chlorinated diphenyl. While this plasticizer is not very compatible with cellulose acetate, it is not inflammable under ordinary conditions of use and increases the resistance of the composition to alkalis met with in laundering and to the acids of perspiration. Other compounds having similar properties which can be used with advantage as the resistant agent in lieu of chlorinated diphenyl are other chlorinated liquid compounds such as chlorinated naphthaline. A dibutyl phthalate or tricresyl phosphate may be substituted where the non-burning feature and maximum alkali resistance are not essential.

The various preferred constituents aforesaid may be employed in the composition in accordance with the following example although it is to be understood that these proportions are given by way of example only and may be departed from. A mixture of the following is first prepared:

*Example I*

| | Per cent by volume |
|---|---|
| Acetone | 57 |
| Ethyl methyl ketone | 19 |
| Methyl phthalyl ethyl glycolate | 18 |
| Chlorinated diphenyl | 6 |

To each gallon of the above mixture is then added:

| | Ounces |
|---|---|
| Cellulose acetate | 16½ |
| Nitrocellulose | 15½ |

In the composition in accordance with this invention, the resistant agent, such as chlorinated diphenyl may be omitted, in which event the proportion of the other solvents and plasticizers should be proportionately increased. An example of such a composition is as follows:

*Example II*

| | Per cent by volume |
|---|---|
| Acetone | 57 |
| Ethyl methyl ketone | 19 |
| Methyl phthalyl ethyl glycolate | 24 |

To each gallon of the above mixture is then added:

| | Ounces |
|---|---|
| Cellulose acetate | 16½ |
| Nitrocellulose | 15½ |

The solids remaining after the evaporation of the solvents in Example II would comprise one part of cellulose ester to about one and two tenths parts of plasticizer.

Again an example of the composition where the ethyl methyl ketone is omitted, is as follows:

*Example III*

| | Per cent by volume |
|---|---|
| Acetone | 76 |
| Methyl phthalyl ethyl glycolate | 18 |
| Chlorinated diphenyl | 6 |

To each gallon of the above mixture is then added:

| | Ounces |
|---|---|
| Cellulose acetate | 16½ |
| Nitrocellulose | 15½ |

After evaporation of the solvent in Example III, the solids remaining would comprise one part of cellulose ester to about nine tenths of a part of methyl phthalyl ethyl glycolate.

Similarly, either the nitrocellulose or the cellulose acetate be omitted together with or without the diluent and the resistant agent, the amount of the other cellulose derivative being proportionately increased so that a total of 32 ounces of the cellulose derivative is employed to each gallon of the mixture.

Coloring matter such as dyes or pigments may be mixed with the thermoplastic adhesive of this invention wherever the adhesive is to be used with colored material, a coloring matter being employed of substantially the same color as the material to be adhered and/or stiffened.

The thermoplastic adhesive of this invention has the property, upon heating, of forming a liquid capable of flowing as distinguished from merely becoming plastic and somewhat sticky. It hardens again upon cooling to a mass of the desired degree of stiffness.

After preparing the thermoplastic adhesive as above described, it may be coated on one or both sides of a sheet or lamination and allowed to dry. It may be applied, preferably in a thin coating, in various ways, as by knife or roller coating, spraying, brushing or by dipping. The coated material is now ready to receive the outer lamination or laminations. These are juxtaposed and the assembly subjected to heat or pressure or preferably both. A temperature of approximately 275° F. and the pressure exerted by an ordinary flat iron softens the adhesive sufficiently so that the outer layer or layers are firmly and permanently secured by the adhesive to the inner or base lamination upon cooling.

The laminated material thus produced when of fabric destined to be made up into collars and other wearing apparel has a predetermined stiffness, which is comparable to a starched collar and yet has that degree of flexibility or softness of the so-called semi-soft collar, due to the proportions and characteristics of the plasticizer, conducive to comfort of the wearer. The outer fabric of the laminated material has the appearance and feel of an ordinary fabric and the outer layers are permanently bonded to the lining. During washing, the laminated material softens somewhat, thereby facilitating the ready cleansing of articles made from this material, whereas when the same is thereafter ironed, it again becomes stiff as is desired and without the use of starch. The novel laminated material of the present invention is especially suitable for use in making collars, cuffs, shirt fronts, shoes, corsets, leather goods, labels, and the like where a degree of stiffness is desired. Instead of fabricating a triple layer laminated material, I may produce a two, four or other multiple layer fabric or material.

Various modifications and variations will occur to those skilled in the art in the proportions and constitutents of the adhesive of this invention as well as in substitution of one ingredient for another having substantially the same effect in the composition and in the use made of the adhesive and no limitation is intended by the phraseology of the foregoing description except as indicated in the appended claims.

What is claimed is:

1. A thermoplastic adhesive composition comprising the solids left upon the evaporation of the volatile solvents in a mixture of acetone, 57% by volume; ethyl methyl ketone, 19% by volume; methyl phthalyl ethyl glycolate, 18% by volume; chlorinated diphenyl, 6% by volume; to which is added cellulose acetate in the proportion of 16½ ounces to each gallon of mixture and nitrocellulose in the proportion of 15½ ounces to each gallon of said mixture.

2. A thermoplastic adhesive composition comprising the solids left upon the evaporation of the volatile solvents in a mixture of acetone, ethyl methyl ketone, methyl phthalyl ethyl glycolate, chlorinated diphenyl, to which is added cellulose acetate in the proportion of 16½ ounces to each gallon of mixture and nitrocellulose in the proportion of 15½ ounces to each gallon of said mixture.

3. A thermoplastic adhesive composition comprising the solids left upon the evaporation of the volatile solvents in a mixture of acetone, 76% by volume; methyl phthalyl ethyl glycolate, 18% by volume; and chlorinated diphenyl, 6% by volume; to which is added cellulose acetate in the proportion of 16½ ounces to each gallon of mixture and nitrocellulose in the proportion of 15½ ounces to each gallon of said mixture.

4. A thermoplastic adhesive composition comprising the solids left upon the evaporation of the volatile solvents in a mixture of acetone, methyl phthalyl ethyl glycolate and chlorinated diphenyl, to which is added cellulose acetate in the proportion of 16½ ounces to each gallon of mixture and nitrocellulose in the proportion of 15½ ounces to each gallon of said mixture.

5. A thermoplastic adhesive composition comprising the solids left upon the evaporation of the volatile solvents in a mixture of a solvent including acetone, 76% by volume; methyl phthalyl ethyl glycolate, 18% by volume; chlonated diphenyl, 6% by volume; to which is added cellulose acetate in the proportion of 32 ounces to each gallon of mixture.

6. A thermoplastic adhesive composition comprising the solids left upon the evaporation of the volatile solvents in a mixture of a solvent including acetone, 76% by volume; methyl phthalyl ethyl glycolate, 18% by volume; chlorinated diphenyl, 6% by volume; to which is added nitrocellulose in the proportion of 32 ounces to each gallon of said mixture.

7. A multiply fabric for use in articles subjected to repeated laundering comprising a plurality of layers joined together by a thermoplastic adhesive which will soften at a temperature of about 275° F., comprising essentially a cellulose ester selected from the group consisting of cellulose acetate and cellulose nitrate plasticized with a substantially equal amount of methyl phthalyl ethyl glycolate.

GUSTAVE KLINKENSTEIN.